United States Patent
Price et al.

(10) Patent No.: US 10,569,324 B2
(45) Date of Patent: *Feb. 25, 2020

(54) METHOD OF MAKING A RETORT CONTAINER

(71) Applicant: SONOCO DEVELOPMENT, INC., Hartsville, SC (US)

(72) Inventors: Trevor Price, North Canton, OH (US); Jeremy Morin, Zionsville, IN (US)

(73) Assignee: SONOCO DEVELOPMENT, INC., Hartsville, SC (US)

(*) Notice: Subject to any disclaimer, the term of this patent is extended or adjusted under 35 U.S.C. 154(b) by 0 days.

This patent is subject to a terminal disclaimer.

(21) Appl. No.: 16/514,350

(22) Filed: Jul. 17, 2019

(65) Prior Publication Data
US 2019/0337042 A1    Nov. 7, 2019

Related U.S. Application Data

(63) Continuation of application No. 13/445,162, filed on Apr. 12, 2012, now Pat. No. 10,399,139.

(51) Int. Cl.
*B21D 51/26* (2006.01)
*B65B 7/28* (2006.01)
(Continued)

(52) U.S. Cl.
CPC ........ *B21D 51/2623* (2013.01); *B29C 65/368* (2013.01); *B29C 65/3656* (2013.01);
(Continued)

(58) Field of Classification Search
None
See application file for complete search history.

(56) References Cited

U.S. PATENT DOCUMENTS 2,828,903 A  4/1958  Adkins
3,073,478 A  1/1963  Henchert
(Continued)

FOREIGN PATENT DOCUMENTS

CA  2489218 A1  7/2005
CH  422690  10/1966
(Continued)

OTHER PUBLICATIONS

ELIBRARY.RU—Advances in fusion bonding techniques for joining thermoplastic matri . . . [online] [retrieved Jan. 14, 2011]. Retrieved from the Internet: <URL: http://elibrary.ru/item.sp?id=585705>. 1 page.

(Continued)

*Primary Examiner* — Viren A Thakur
*Assistant Examiner* — Thanh H Nguyen
(74) *Attorney, Agent, or Firm* — Nelson Mullins Riley and Scarborough, LLP

(57) ABSTRACT

A method is described for making a retort container having one or two metal ends. A heat-sealable material is present on one or both of the container side wall and the/each metal end. The/each metal end is seamed onto the container body, and the resulting container assembly is conveyed on a conveyor adjacent to an induction sealing head and then adjacent to a cooling device. A pressure belt engages the upper end of the container assembly to keep the metal end from coming off the container body during the induction heating and cooling processes.

19 Claims, 6 Drawing Sheets

(51) Int. Cl.
  *B65B 51/22* (2006.01)
  *B29C 65/00* (2006.01)
  *B29C 65/78* (2006.01)
  *B29C 65/46* (2006.01)
  *B29C 65/36* (2006.01)

(52) U.S. Cl.
  CPC .......... *B29C 65/46* (2013.01); *B29C 65/7873* (2013.01); *B29C 66/12441* (2013.01); *B29C 66/12461* (2013.01); *B29C 66/5432* (2013.01); *B29C 66/72321* (2013.01); *B29C 66/742* (2013.01); *B65B 7/2878* (2013.01); *B65B 51/227* (2013.01); *B29C 66/135* (2013.01); *B29C 66/71* (2013.01); *B29C 66/83423* (2013.01)

(56) References Cited

U.S. PATENT DOCUMENTS

| | | |
|---|---|---|
| 3,405,439 A | 10/1968 | Uemura |
| 3,406,891 A | 10/1968 | Buchner et al. |
| 3,549,440 A | 12/1970 | Adcock et al. |
| 3,616,047 A | 10/1971 | Kehe |
| 3,625,785 A | 12/1971 | Holmstrom et al. |
| 3,694,609 A | 9/1972 | Kennedy |
| 3,774,801 A | 11/1973 | Gedde |
| 3,843,014 A | 10/1974 | Cospen et al. |
| 3,868,917 A | 3/1975 | Arfert |
| 3,909,326 A | 9/1975 | Renck |
| 3,912,154 A | 10/1975 | Godar |
| 3,934,749 A | 1/1976 | Andrulionis |
| 3,978,232 A | 8/1976 | Dodsworth et al. |
| 3,988,185 A | 10/1976 | Johnson et al. |
| 4,093,102 A | 6/1978 | Kraska |
| 4,095,390 A | 6/1978 | Knudsen |
| 4,217,843 A | 8/1980 | Kraska |
| 4,241,864 A | 12/1980 | Kessler |
| 4,428,741 A | 1/1984 | Westphal |
| 4,448,322 A | 5/1984 | Kraska |
| 4,530,442 A | 7/1985 | Vogel, Jr. et al. |
| 4,538,758 A | 9/1985 | Griffith |
| 4,588,621 A * | 5/1986 | Bunel ................ B32B 15/12 229/4.5 |
| 4,606,472 A | 8/1986 | Taube et al. |
| 4,626,157 A | 12/1986 | Franek et al. |
| 4,643,330 A | 2/1987 | Kennedy |
| 4,667,842 A | 5/1987 | Collins |
| 4,674,649 A | 6/1987 | Pavely |
| 4,711,362 A | 12/1987 | Korcz et al. |
| 4,716,755 A | 1/1988 | Bulso, Jr. et al. |
| 4,735,339 A | 4/1988 | Benge et al. |
| 4,758,704 A | 7/1988 | Kogel |
| 4,808,052 A | 2/1989 | Bulso, Jr. et al. |
| 4,809,861 A | 3/1989 | Wilkinson et al. |
| 4,890,759 A | 1/1990 | Scanga et al. |
| 4,891,484 A | 1/1990 | Waggott et al. |
| 4,940,158 A | 7/1990 | Farrell et al. |
| 4,941,306 A | 7/1990 | Pfaffmann et al. |
| 4,948,006 A | 8/1990 | Okabe et al. |
| 4,991,735 A | 2/1991 | Biondich |
| 5,025,123 A | 6/1991 | Pfaffmann et al. |
| 5,025,124 A | 6/1991 | Alfredeen |
| 5,046,637 A | 9/1991 | Kysh |
| 5,053,593 A | 10/1991 | Iguchi |
| 5,069,355 A | 12/1991 | Matuszak |
| 5,071,029 A | 12/1991 | Umlah et al. |
| 5,249,701 A | 10/1993 | Daehn |
| 5,257,709 A | 11/1993 | Okabe et al. |
| 5,331,127 A | 7/1994 | Chen |
| 5,360,498 A | 11/1994 | Blomqvist et al. |
| 5,501,362 A | 3/1996 | Cudzik |
| 5,562,799 A * | 10/1996 | Ross ................ B29C 65/46 156/567 |
| 5,590,807 A | 1/1997 | Forrest et al. |
| 5,598,734 A | 2/1997 | Forrest et al. |
| 5,721,028 A | 2/1998 | Suzuki et al. |
| 5,847,370 A | 12/1998 | Sluka et al. |
| 5,858,141 A | 1/1999 | Repp et al. |
| 5,971,259 A | 10/1999 | Bacon |
| 5,977,527 A | 11/1999 | Preston et al. |
| 6,043,471 A | 3/2000 | Wiseman et al. |
| 6,078,033 A | 6/2000 | Bowers et al. |
| 6,079,185 A | 6/2000 | Palaniappan et al. |
| 6,102,243 A | 8/2000 | Fields et al. |
| 6,104,013 A | 8/2000 | Miller |
| 6,116,500 A | 9/2000 | Cahill |
| 6,194,041 B1 | 2/2001 | McHenry et al. |
| 6,262,402 B1 | 7/2001 | Isoyama et al. |
| 6,408,498 B1 | 6/2002 | Fields et al. |
| 6,412,252 B1 | 7/2002 | Sarles et al. |
| 6,419,110 B1 | 7/2002 | Stodd |
| 6,460,723 B2 | 10/2002 | Nguyen et al. |
| 6,477,823 B1 | 11/2002 | Kitterman et al. |
| 6,499,622 B1 | 12/2002 | Neiner et al. |
| 6,516,968 B2 | 2/2003 | Stodd |
| 6,555,801 B1 | 4/2003 | LeMieux et al. |
| 6,629,399 B2 | 10/2003 | Sarles et al. |
| 6,702,142 B2 | 3/2004 | Neiner |
| 6,725,630 B2 | 4/2004 | Rea et al. |
| 6,732,495 B2 | 5/2004 | Sarles et al. |
| 6,736,283 B2 | 5/2004 | Santamaria et al. |
| 6,747,252 B2 | 6/2004 | Herzog |
| 6,875,965 B2 | 4/2005 | Herzog |
| 6,915,553 B2 | 7/2005 | Turner et al. |
| 6,964,796 B1 | 11/2005 | Koyama et al. |
| 7,065,941 B2 | 6/2006 | Sarles et al. |
| 7,100,789 B2 | 9/2006 | Nguyen et al. |
| 7,119,310 B2 | 10/2006 | Hammen et al. |
| 7,137,524 B2 | 11/2006 | Nomula |
| 7,174,762 B2 | 2/2007 | Turner et al. |
| 7,318,536 B2 | 1/2008 | Maravich et al. |
| 7,341,163 B2 | 3/2008 | Stodd |
| 7,370,774 B2 | 5/2008 | Watson et al. |
| 7,380,684 B2 | 6/2008 | Reed et al. |
| 7,484,639 B2 | 2/2009 | Maravich et al. |
| 7,591,392 B2 | 9/2009 | Watson et al. |
| 7,772,518 B2 | 8/2010 | Rajesh et al. |
| 8,360,125 B2 | 1/2013 | Schwiese et al. |
| 8,939,695 B2 | 1/2015 | Price et al. |
| 8,998,027 B2 | 4/2015 | Price et al. |
| 9,499,299 B2 | 11/2016 | Price et al. |
| 9,783,337 B2 | 10/2017 | Price et al. |
| 2001/0032839 A1 | 10/2001 | Herzog |
| 2003/0089079 A1 | 5/2003 | Rea et al. |
| 2005/0029269 A1 | 2/2005 | Stodd et al. |
| 2005/0252918 A1 | 11/2005 | McKnight et al. |
| 2006/0071005 A1 | 4/2006 | Bulso |
| 2006/0186127 A1 | 8/2006 | Rajesh et al. |
| 2006/0191940 A1 | 8/2006 | Heyn |
| 2007/0095487 A1 | 5/2007 | Gruver et al. |
| 2007/0187352 A1 | 8/2007 | Kras et al. |
| 2008/0041867 A1 | 2/2008 | Jochem et al. |
| 2008/0050207 A1 | 2/2008 | Turner et al. |
| 2008/0078766 A1 | 4/2008 | Oberholzer |
| 2008/0216960 A1 | 9/2008 | Schwiese |
| 2009/0020543 A1 | 1/2009 | Bulso |
| 2009/0230079 A1 | 9/2009 | Smolko |
| 2009/0257847 A1 | 10/2009 | Schumann et al. |
| 2009/0269169 A1 | 10/2009 | Turner et al. |
| 2010/0006532 A1 | 1/2010 | Lee |
| 2010/0006571 A1 | 1/2010 | Shibasaka et al. |
| 2010/0038365 A1 | 2/2010 | Ishida et al. |
| 2010/0059530 A1 * | 3/2010 | Niec ................ B65D 17/4011 220/623 |
| 2010/0176134 A1 | 7/2010 | Cramer |
| 2011/0095030 A1 | 4/2011 | Dunn et al. |
| 2011/0226787 A1 | 9/2011 | Yourist |
| 2012/0321415 A1 | 12/2012 | Price et al. |
| 2013/0059048 A1 | 3/2013 | Price et al. |
| 2013/0105467 A1 | 5/2013 | Morin et al. |

(56) References Cited

U.S. PATENT DOCUMENTS

| | | |
|---|---|---|
| 2013/0272820 A1 | 10/2013 | Price et al. |
| 2017/0369201 A1 | 12/2017 | Price et al. |

FOREIGN PATENT DOCUMENTS

| | | |
|---|---|---|
| CN | 2143601 Y | 10/1993 |
| CN | 1230154 A | 9/1999 |
| CN | 2723366 Y | 9/2005 |
| EP | 0099159 A2 | 1/1984 |
| EP | 0420519 A1 | 4/1991 |
| EP | 0742152 A1 | 11/1996 |
| GB | 1078696 | 8/1967 |
| GB | 1207306 | 9/1970 |
| GB | 2051627 A | 1/1981 |
| GB | 2067158 A | 7/1981 |
| GB | 2384478 A | 7/2003 |
| JP | 8-151041 A | 6/1996 |
| RU | 2202502 C2 | 4/2003 |
| WO | WO 95/34469 A1 | 12/1995 |
| WO | WO 96/37414 A1 | 11/1996 |
| WO | WO 2006/050465 A1 | 5/2006 |
| WO | WO 2007/014211 A1 | 2/2007 |
| WO | WO 2011/053451 A1 | 5/2011 |
| WO | WO 2013/033343 A1 | 3/2013 |
| WO | WO 2013/063063 A1 | 5/2013 |
| WO | WO 2013/154908 A1 | 10/2013 |

OTHER PUBLICATIONS

International Search Report for Application No. PCT/US2012/061615; dated Feb. 6, 2013.
International Preliminary Report on Patentability/Written Opinion for Application No. PCT/US2012/061615 dated Apr. 29, 214.
International Search Report/Written Opinion for Application No. PCT/US2012/053062 dated Nov. 5, 2012.
International Preliminary Report on Patentability for Application No. PCT/US2012/053062 dated Mar. 4, 2014.
International Search Report and Written Opinion for Application No. PCT/US2012/035283 dated Jun. 25, 2013.
Office Action for Canadian Patent Application No. 2,847,432 dated Nov. 25, 2014.
Office Action for Chinese Patent Application No. 201280053353.7 dated Mar. 24, 2015.
Office Action for Chinese Patent Application No. 201280053353.7 dated Jun. 3, 2015.
Notice of Allowance for Russian Application No. 2014110102/12 dated Aug. 24, 2015.
Notice of Allowance for Canadian Application No. 2,847,432 dated Sep. 3, 2015.
U.S. Appl. No. 13/161,713, filed Jun. 16, 2011; first named inventor: Price.
Office Action for Chinese Patent Application No. 201280053353.7 dated Dec. 11, 2015.
Substantive Examination Report for Philippines Patent Application No. 1/2014/500469 dated Mar. 17, 2016, 2 pages.
Notice of Allowance for Chinese Application No. 201280053353.7 dated Apr. 26, 2016.
Notice of Allowance for Mexican Application No. MX/A/2014/002455 dated May 6, 2016 (No Eng Trans).
Office Action for Canadian Application No. 2,870,266 dated Jul. 27, 2016.
Rule 71(3) Communication, Notice of Allowance for European Patent Application No. 12759313.5 dated Sep. 9, 2016, 6 pages.
Office Action for U.S. Appl. No. 13/161,713 dated Mar. 3, 2014.
Office Action for U.S. Appl. No. 13/224,651 dated Mar. 28, 2014.
Office Action for U.S. Appl. No. 13/224,651 dated Jul. 10, 2014.
Office Action for U.S. Appl. No. 13/284,056 dated Jul. 31, 2014.
Notice of Allowance for U.S. Appl. No. 13/161,713 dated Sep. 18, 2014, 14 pages.
Notice of Allowance for U.S. Appl. No. 13/224,651 dated Dec. 5, 2014.
Office Action for U.S. Appl. No. 13/284,056 dated Apr. 1, 2015.
Office Action for U.S. Appl. No. 14/638,420 dated Apr. 26, 2016.
Notice of Allowance for U.S. Appl. No. 14/638,420 dated Jul. 22, 2016.
Office Action from Canadian Patent Application No. 2,870,266 dated Feb. 22, 2017.

\* cited by examiner

METHOD OF MAKING A RETORT CONTAINER

CROSS-REFERENCE TO RELATED APPLICATIONS

This application is a continuation of U.S. patent application Ser. No. 13/445,162, filed Apr. 12, 2012 entitled "Method of Making A Retort Container", which is related to U.S. patent application Ser. No. 13/224,651 filed on Sep. 2, 2011, and U.S. patent application Ser. No. 13/284,056 filed on Oct. 28, 2011, the entire disclosures of said applications being hereby incorporated herein by reference.

BACKGROUND OF THE INVENTION

The present disclosure relates to containers, particularly to containers having one or two metal ends applied to one or both ends of the container body and crimp-seamed or double-seamed onto the container body, and most particularly to such containers used for retort processing.

Traditionally, retort containers have been constructed substantially of metal. For many decades the standard retort food containers have been three-piece or two-piece metal cans. In a three-piece metal can, a metal can body is closed by a pair of metal ends that are typically double-seamed onto the ends of the can body. A two-piece metal can eliminates one of the metal ends because the can body is a deep-drawn body with an integral bottom wall. The metal ends of such typical retort containers have an outer peripheral portion forming a "curl" that receives the end of the can body, and after the end is applied the curl and the wall of the can body are rolled up together to form a double seam. This construction has the great advantage that it readily withstands retort processing without the seams being compromised, because the plastically deformed metal of the can body in the seam area tends to hold its deformed shape despite the high pressure and temperature during retort.

More recently there has been a desire to construct retort containers that use less metal, motivated by the potential cost reduction and improved aesthetics that such a construction can offer. The development described in the present disclosure at least in some aspects is aimed at addressing this desire.

BRIEF SUMMARY OF THE INVENTION

In particular, the present disclosure describes a retort container having one or two metal ends attached to a container body in such a way that there is an improvement in blow-off resistance when the inside of the container is pressurized relative to outside ambient pressure for any reason (e.g., during retort processing, or as a result of changes in altitude of the container, such as when a container is filled and sealed at sea level and is subsequently transported to a high-altitude location). The improvement derives from a thermal fusing of the metal end to the container body, as described herein. This could allow the container body to be a thinner metal than typically used for metal retort containers, where the thinner metal would have less resistance to "unrolling" under high internal-pressure conditions, or could allow the container body to be formed of a non-metallic material (e.g., plastic or composite), since blow-off resistance is not dependent primarily upon the ability of the rolled-up container end in the seam being able to hold its deformed shape.

In accordance with the invention in one embodiment, a method of making a retort container comprises the steps of:
providing a container body having a side wall extending about a container body axis, the side wall having a lower end and an upper end, the upper end defining an upper edge that extends about a top opening of the container body, the side wall having an inner surface and an outer surface;
applying a metal end to the upper end of the container body, the metal end having at least a metal layer and comprising a central portion and an outer peripheral portion extending generally radially outwardly from the central portion and extending circumferentially about the central portion, the peripheral portion having a radially outer part and a radially inner part, a first heat-sealable material being present on at least one of (a) a lower surface of at least the peripheral portion of the metal end and (b) the inner surface of the side wall adjacent the upper end thereof, the radially outer part of the peripheral portion defining a curl, the radially inner part of the peripheral portion defining a chuck wall that extends generally downward from the curl and has a radially outer surface forming an interface with the inner surface of the side wall of the container body;
forming a seam connecting the metal end to the upper end of the side wall, the seam having the curl of the metal end and the upper end of the side wall interlocked, the container body and seamed metal end constituting a container assembly;
disposing the container assembly between a lower conveyor and an upper pressure belt which cooperatively engage opposite ends of the container assembly to prevent the metal end from coming off the container body, and which convey the container assembly along a path; and
induction heating the metal end to melt the first heat-sealable material and then cooling the first heat-sealable material so as to fuse the metal end onto the container body, wherein the heating and cooling steps take place during the engagement of the conveyor and pressure belt with the container assembly.

Heat-sealable materials useful in the practice of the present invention can comprise any known heat-sealable materials. The metal end can have an interior coating, and optionally an exterior coating as well.

The container body can be open at both ends that are each closed by a metal end in accordance with the invention, or can be open at only one end such that only one metal end is needed. The container body can be made in various ways. For example, the container body when metal can be formed from sheet metal seamed along a longitudinal seam in the usual way, or can be deep drawn to have an integral bottom wall. When plastic, the container body can be formed by any of blow-molding, thermoforming, or injection-molding so as to have a bottom wall integrally joined to the side wall, or extruded so as be open at both ends.

In some embodiments, the metal end is an easy-open end having a severable panel defined by a score line in the metal layer. Alternatively, the metal end can be a sanitary end, or the metal end can comprise a membrane sealed to an annular metal ring.

The step of forming a seam can comprise forming a crimp seam, or it can comprise forming a double seam by rolling the curl of the metal end and the upper end of the side wall together so as to form the upper end of the side wall into a body hook and to form the curl into an end hook and to interlock the body hook and the end hook.

In some embodiments the method can further comprise providing a second heat-sealable material present on the other of (a) the lower surface of at least the peripheral portion of the metal end and (b) the inner surface of the side wall adjacent the upper end thereof. Thus, the metal end and the side wall both have respective heat-sealable materials thereon. The method entails placing the second heat-sealable material and the first heat-sealable material in contact with each other at the interface between the chuck wall and the side wall, and heating the first and second heat-sealable materials to a temperature sufficient to cause the first and second heat-sealable materials to be softened or melted and to flow together, after which cooling of the first and second heat-sealable materials is allowed to occur so as to fuse the chuck wall to the inner surface of the side wall.

The second heat-sealable material and the first heat-sealable material can be thermally fused together in the seam as well.

The method can further comprise the steps of filling the container with a food product prior to the step of applying the metal end to the container body, and, after the interface between the chuck wall and the side wall is fused, retorting the container. During the retorting step the thermoplastic container body is radially unconstrained such that the container body is allowed to expand radially as internal pressure is exerted on the side wall. Notably, the container body is free of any special expansion panels, whereby the radial expansion of the container body occurs substantially uniformly about a circumference of the container body.

In some embodiments, the chuck wall extends at a non-zero acute angle relative to a longitudinal axis of the container body and is configured such that a lower end of the chuck wall is smaller in diameter than the inner surface of the side wall, while an upper end of the chuck wall is larger in diameter than the inner surface of the side wall. The step of applying the metal end to the container body results in the side wall of the container body moving relatively upward from the lower end to the upper end of the chuck wall such that an interference fit is created between the chuck wall and the side wall, thereby creating the intimately contacting interface therebetween.

During the induction heating step there is a substantial absence of external pressure exerted to urge the chuck wall and side wall into intimate contact; rather, pressure urging the chuck wall and side wall together comes from the interference fit that already exists between them when the end is applied and seamed to the side wall. Thus, there is no need for sealing jaws to create pressure during the heating step in order to form a secure thermal bond between the metal end and the container body. Indeed, in some embodiments the heating step can be carried out with induction heating in which there can be an absence of contact between the induction tool and the metal end.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE DRAWINGS

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. The drawings are not necessarily to scale, and thus the relative proportions of various elements (e.g., thicknesses of layers in multi-layer structures) suggested by the drawings is not necessarily indicative of the actual relative proportions.

Figure 1:
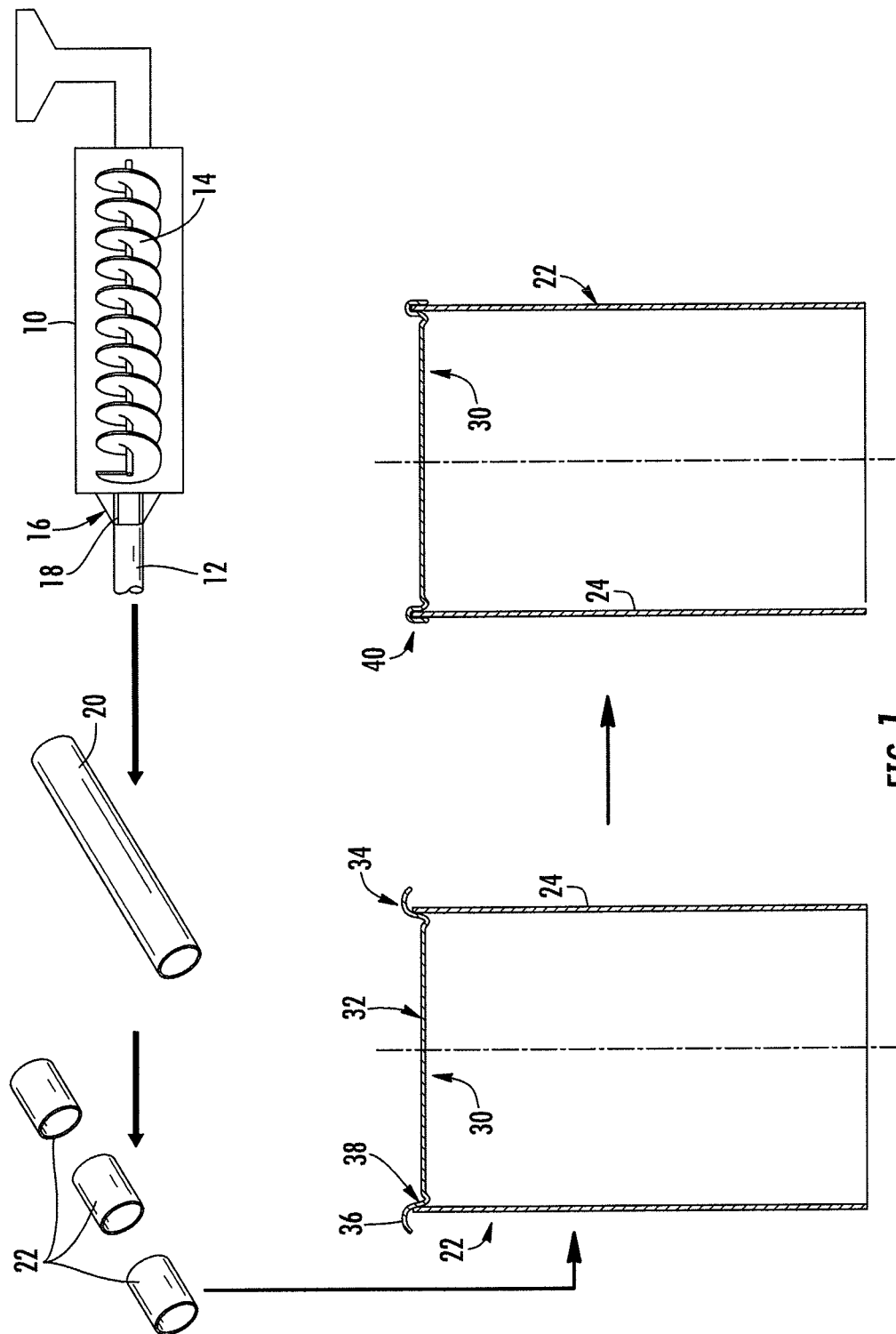
FIG. 1 is a diagrammatic depiction of several steps of a process for making containers in accordance with one embodiment of the invention.

With reference to FIG. 1, several steps of a process for making containers in accordance with an embodiment of the invention are schematically depicted. In a first step, an extruder 10 is employed to extrude a substantially thermoplastic tube 12 as a continuous extrusion. The extruder 10 includes a screw 14 or the like that feeds a molten substantially thermoplastic material under pressure through a die 16 such that the continuous tube 12 is extruded through an annular die orifice 18. The extruded tube 12 can have a monolayer or multi-layer construction. As an example of a multi-layer construction, the tube wall can have the structure (from ID to OD): heat-sealable layer/tie layer/barrier layer/tie layer/heat-sealable layer.

The tube 12 is cooled sufficiently (via known cooling means, not illustrated) and is then cut into parent tubes 20 of a convenient length. Typically each parent tube 20 will be of sufficient length to provide a plurality of container bodies 22 cut from the parent tube as shown.

Alternatively, in the case of metal container bodies 22, they are manufactured according to known techniques (not shown).

Each container body 22 is then mated with a pair of metal ends 30.

The metal end 30 and container body 22 in some embodiments can be constructed to mate with each other as described in Applicant's co-pending application Ser. No. 13/161,713 filed on Jun. 16, 2011, the entire disclosure of which is hereby incorporated herein by reference.

The metal end 30 includes a central portion 32 and an outer peripheral portion 34 extending generally radially outwardly from the central portion 32 and extending circumferentially about the central portion 32. The peripheral portion 34 has a radially outer part and a radially inner part. The radially outer part defines a curl 36 having a lower surface that is generally concave downward in an axial direction of the metal end. The radially inner part defines a chuck wall 38 that extends generally downward and radially inward from the curl 36. The chuck wall 38 can be a compound-angle chuck wall, as described in the above-noted '713 application, having an upper part adjacent the curl 36 and a lower part joined to and positioned below the upper part. The upper part of the chuck wall is substantially linear and oriented relative to the axial direction at a relatively smaller non-zero angle and the lower part of the chuck wall is substantially linear and oriented relative to the axial direction at a relatively larger angle compared to the upper part of the chuck wall.

The metal end 30 is configured such that at least a bottom edge of the lower part of the chuck wall has an outside diameter that is smaller than the inside diameter of the container body side wall 24 at the upper edge thereof. Additionally, the chuck wall 38 is configured such that it becomes somewhat larger in diameter than the inside diameter of the container body side wall 24 as the top edge of the side wall progresses up toward the curl 36 during mate-up of the metal end 30 with the container body 22. In other words, the side wall's ID is undersized in relation to the OD of the chuck wall adjacent the curl. This has the effect of "wiping" the inner surface of the side wall 24 with the metal end during mate-up, which has the benefit of cleaning the inner surface prior to seaming. This also results in an interference fit between the chuck wall 38 and the side wall 24.

Figure 2:
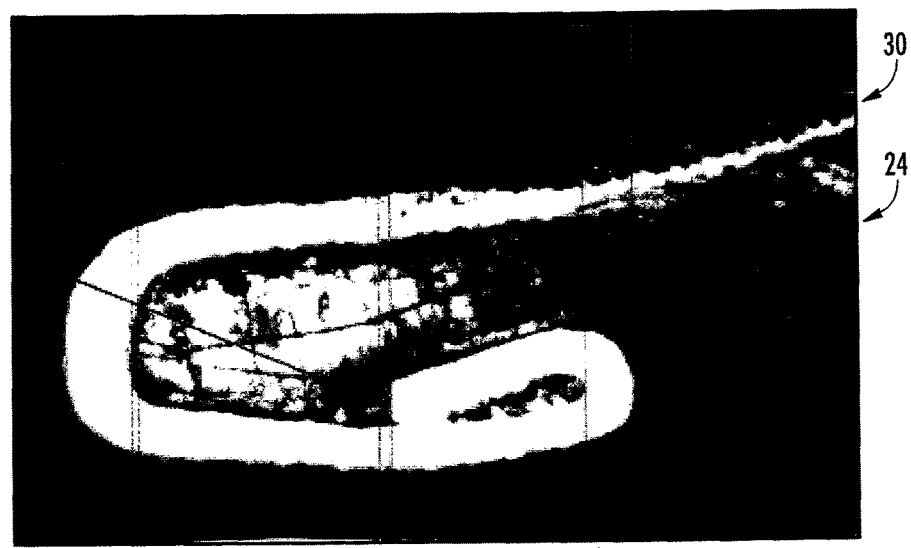
FIG. 2 is a photomicrograph of a sectioned container in the region of the metal end's seam with the container body, in accordance with an embodiment of the invention.

Once the metal end 30 is mated with the container body 22, a seaming operation is performed in order to seam the metal end onto the container body. In the illustrated embodiment, the container body is a straight-walled (non-flanged) container body, and a crimp seam 40 is formed between the metal end and the container body, in which the side wall 24 remains substantially straight and is compressed between the chuck wall 38 and a deformed portion of the curl 36. Alternatively, in other embodiments, a double seam can be formed, in which case the container body can be flanged. The crimp seam 40 has the advantage of being usable with non-flanged container bodies and yet providing a positive locking of the metal end 30 onto the container body 22 even before the metal end is heat-sealed to the container body. This can be seen in FIG. 2, which is a photomicrograph of a sectioned container in the region of the crimp seam 40. A "nub" or interlocking portion of the container body side wall is formed by the folded peripheral edge of the curl "biting" into the side wall. The nub and the folded edge effectively interlock, thereby locking the metal end onto the container body.

It will be understood, of course, that a second metal end is attached to the opposite end of the container body 22 in the same fashion described above. Alternatively, in the case of a container body having an integral bottom wall (as may be the case with, for example, a blow-molded, thermo-formed, or injection-molded plastic container body, or a deep-drawn metal container body), the second metal end is not required.

The above-described interlocking of the metal end 30 and container body 22 alone, however, may not be sufficient to enable the container to withstand a retort process in some container configurations, such as when the container body 22 is plastic or is a thin metal or a composite material. In order to be able to withstand retort intact in those instances, the container is subjected to a heat-sealing operation to fuse portions of the metal end 30 to the container body side wall 24. In this regard, at least one of the respective surfaces of the metal end and side wall that are intimately contacting each other in the region of the crimp seam 40 is formed by a heat-sealable material, and the two surfaces are such that heating of the crimp seam to soften or melt this heat-sealable material, followed by cooling of the material, causes the two surfaces to be "thermally fused" to each other. More specifically, it is important to the attainment of adequate "blow-off resistance" during retort (or other high-internal-pressure condition of the container) that at least the chuck wall 38 of the metal end 30 be thermally fused to the inner surface of the side wall 24 of the container body, and preferably both the chuck wall 38 should be thermally fused at the ID and a portion of the curl 36 (or, more accurately, what was the curl prior to the seaming operation) should be thermally fused at the OD of the container body side wall 24.

Figure 3:
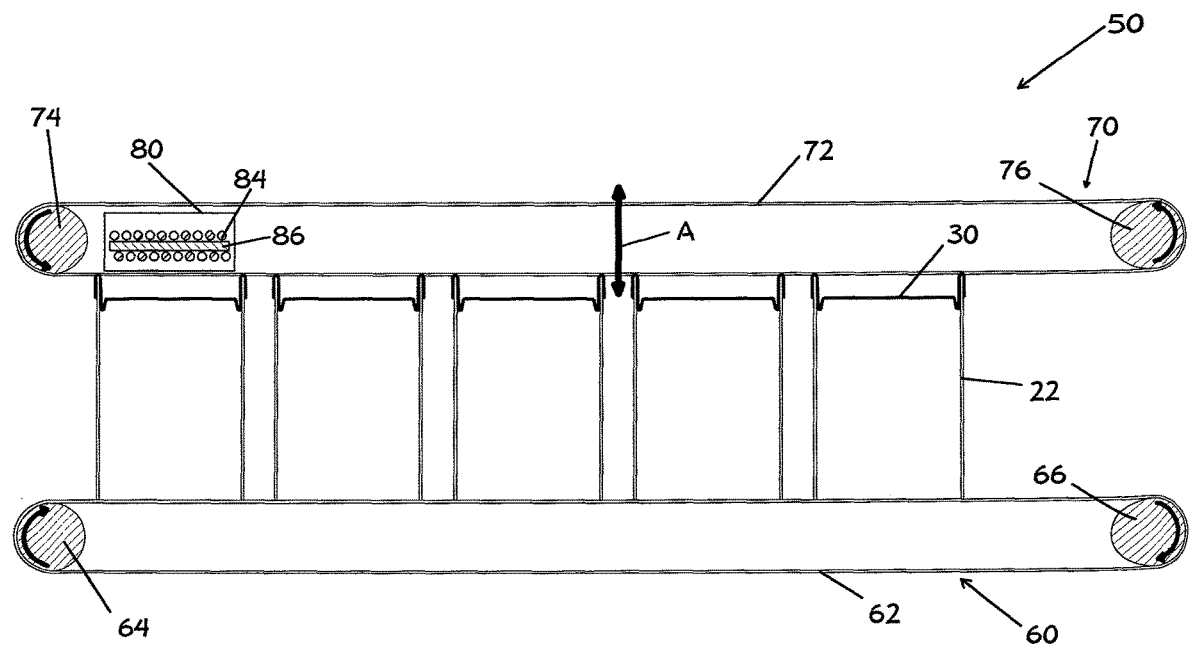
FIG. 3 is a cross-sectional view of an apparatus, along line 3-3 in FIG. 4, in accordance with an embodiment of the invention, showing one step of a method in accordance with an embodiment of the invention.

The thermal fusing operation is diagrammatically depicted in FIG. 3, illustrating an induction sealer 50 that can be used in the practice of the invention, depicted in a diagrammatic cross-sectional view. The sealer 50 includes a conveyor 60 comprising an endless belt 62 looped about a pair of spaced parallel rolls 64, 66. At least one of the rolls 64, 66 is rotatably driven about its axis and in turn drives the belt 62. As shown in FIG. 3, the rolls 64, 66 rotate clockwise and the belt 62 thus travels clockwise such that its upper flight moves from left to right in the figure. The belt 62 supports a series of container assemblies (each consisting of a container body 22 and a metal end 30) on the upper flight of the belt.

The container assemblies are loaded (by suitable means, not shown) onto the conveyor 60. There is a gap between adjacent container assemblies in the conveyance direction (i.e., the left-to-right direction in FIG. 3), as illustrated. This gap may be maintained in a uniform fashion by, for example, configuring the belt 62 to have a series of uniformly spaced recesses each of which receives a container assembly. The belt 62 can be a "single-lane" or "multiple-lane" belt. A single-lane belt has a single row of such recesses extending in the longitudinal (conveyance) direction. A multiple-lane belt has two or more such rows spaced apart widthwise on the belt so that multiple series of container assemblies can be conveyed simultaneously through the induction sealing process. The open ends of the container bodies 22 are against the belt 62 and the metal ends 30 are located at the upper ends of the container bodies.

The apparatus 50 further includes a pressure belt 70 comprising an endless belt 72 looped about a pair of spaced parallel rolls 74, 76. At least one of the rolls 74, 76 is rotatably driven about its axis and in turn drives the belt 72. As shown in FIG. 3, the rolls 74, 76 rotate counterclockwise and the belt 72 thus travels counterclockwise such that its lower flight moves from left to right in the figure. The pressure belt 72 is driven to travel at the same linear speed as that of the conveyor belt 62, and the pressure belt is arranged so that its lower flight presses down on the metal ends 30 in a downward direction toward the conveyor 60.

Figure 4:
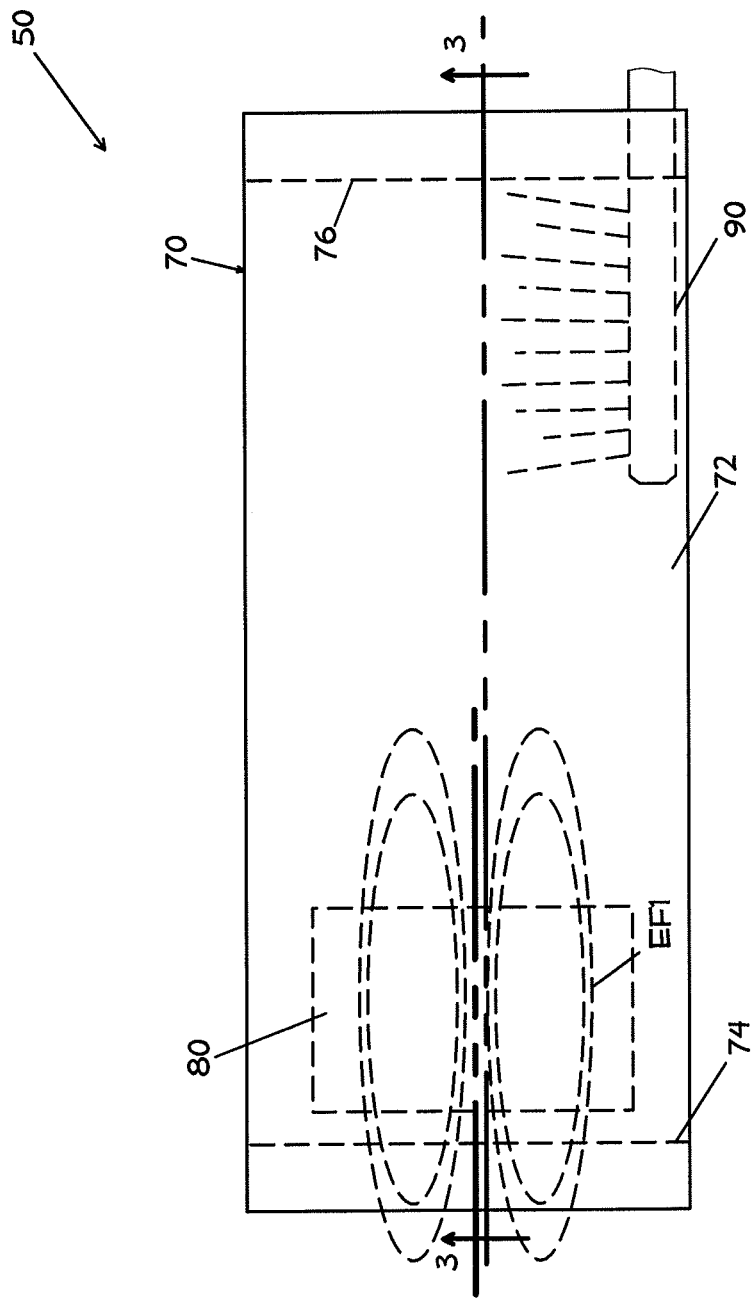
FIG. 4 is a top view of the apparatus of FIG. 3.

Disposed within the loop of (as illustrated), or adjacent to a lower flight of (not shown), the pressure belt 72 is one or more induction heads 80 (only one being illustrated). Each induction head comprises a wire coil 84 and a ferrous core 86, depicted schematically in the figures. The wire coil is wound in a particular configuration so as to produce the desired electromagnetic field when an alternating electrical current is passed through the wire. In particular, as known to those skilled in the art, the coil configuration dictates the pattern and strength of the electromagnetic field for a given AC current. More particularly, the magnetic axis A1 of the induction head 80 is schematically illustrated in FIG. 4 as being parallel to the conveyance direction, but of course the magnetic axis can be oriented with a different orientation with respect to the conveyance direction. The magnetic axis can be parallel to the plane defined by the lower flight of the pressure belt 70, or can lie in a different plane. The illustrated orientation of the magnetic axis A1 is exemplary only, and other orientations can be used.

As each container assembly is carried on the conveyor 60 along the conveyance direction, the electromagnetic field of the induction head 80, schematically illustrated by field lines EF1 in FIG. 4, induces eddy currents through the entirety of a metal end 30 when it comes beneath the head 80. These eddy currents heat the metal layer of the metal end and this heat is conducted to the heat-sealable thermoplastic material, causing the metal end 30 to become thermally fused to the container body 22.

The container assemblies thus have the metal ends 30 sealed to the one end of the container bodies 22 by the action of the induction head 40. As the container assemblies are conveyed beyond the induction head on the conveyor 60, a cooling device 90 (FIG. 4) such as an air knife, water sprayer, or the like, provides cooling to the metal ends while the pressure belt 70 is still applying pressure on the metal ends to keep them from coming off the container bodies. As noted, the pressure belt 70 can be vertically adjustable, as denoted by arrow A in FIG. 3, to accommodate containers of different heights. The pressure belt 70 acts to prevent the containers from growing in height, and thus effectively clamps the metal ends on the container bodies during the cooling process. The cooling of the ends by the cooling device 90 ensures that the heat-sealable thermoplastic material is solidified before the containers are discharged from the conveyor 60.

Figure 5:
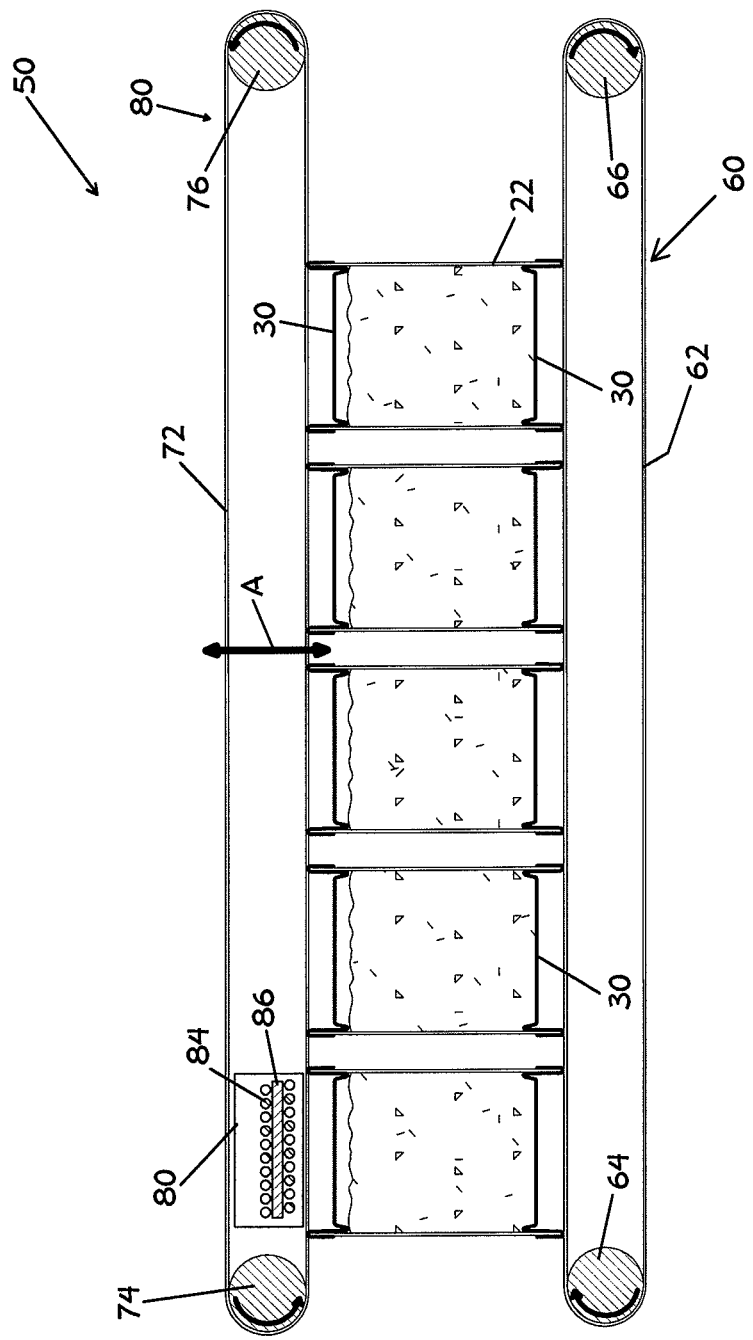
FIG. 5 is a view similar to FIG. 3, showing a further step of a method in accordance with an embodiment of the invention.

Container assemblies produced by the process explained above and depicted in FIG. 3 are of course only partially completed, but are in condition to be filled with the desired contents and sealed closed. FIG. 5 depicts the process of sealing the filled containers closed. After the containers are filled and metal ends are applied and seamed onto the open ends, the containers are again loaded onto the conveyor 60 for a second pass through the apparatus 50. It will be understood, of course, that the apparatus 50 of FIG. 5 may be a duplicate of the apparatus 50 of FIG. 3, and may be located at a different site from that of FIG. 3. For example, at a first site, partial container assemblies, consisting of container bodies 22 closed at only one end by metal ends 30 may be produced as in FIG. 3. These assemblies may be transported to a second site at which another apparatus 50 is located. At this second site, the containers may be filled, metal ends may be seamed onto the open ends to close them, and then these filled containers may be loaded onto the conveyor 60 of the apparatus 50.

In the second pass through the apparatus 50 illustrated in FIG. 5, the process of FIG. 3 is essentially repeated to seal the metal ends 30 onto the container bodies 22. Again, the induction head 40 heats the metal ends 30 to seal them onto the container bodies, and the cooling device 90 cools the metal ends before the containers are discharged from the conveyor 60.

Figure 6:
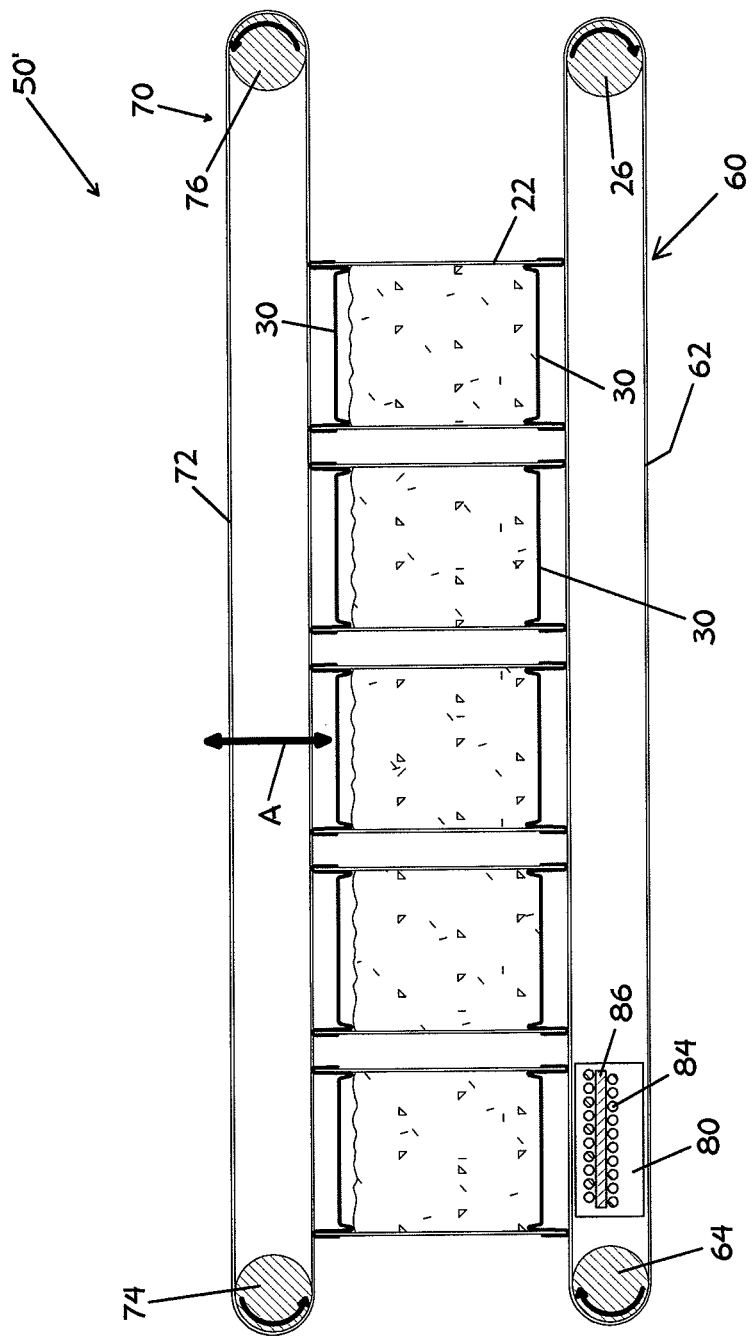
FIG. 6 is a view similar to FIG. 3, but illustrating an alternative embodiment of the invention.

FIG. 6 depicts an apparatus 50' in accordance with an alternative embodiment of the invention. The apparatus 50' differs from the apparatus 50 previously described in that the induction head 40 is located within the loop of (as illustrated), or adjacent to a lower flight of (not shown), the lower belt 62 rather than the upper pressure belt 72. With this arrangement, the product within the containers acts as a heat sink when the second metal end is induction-sealed to each container body.

In the embodiments illustrated and described above, the conveyance path for the workpieces is linear. The present invention, however, is not limited to any particular conveyor configuration. For example, a rotary conveyor (turntable, turret, etc.) can be used for conveying workpieces and multiple induction heads can be disposed adjacent the resulting circular conveyance path for exposing the workpieces to a plurality of differently oriented electromagnetic fields, in a manner closely analogous to that described herein.

Figure 7:
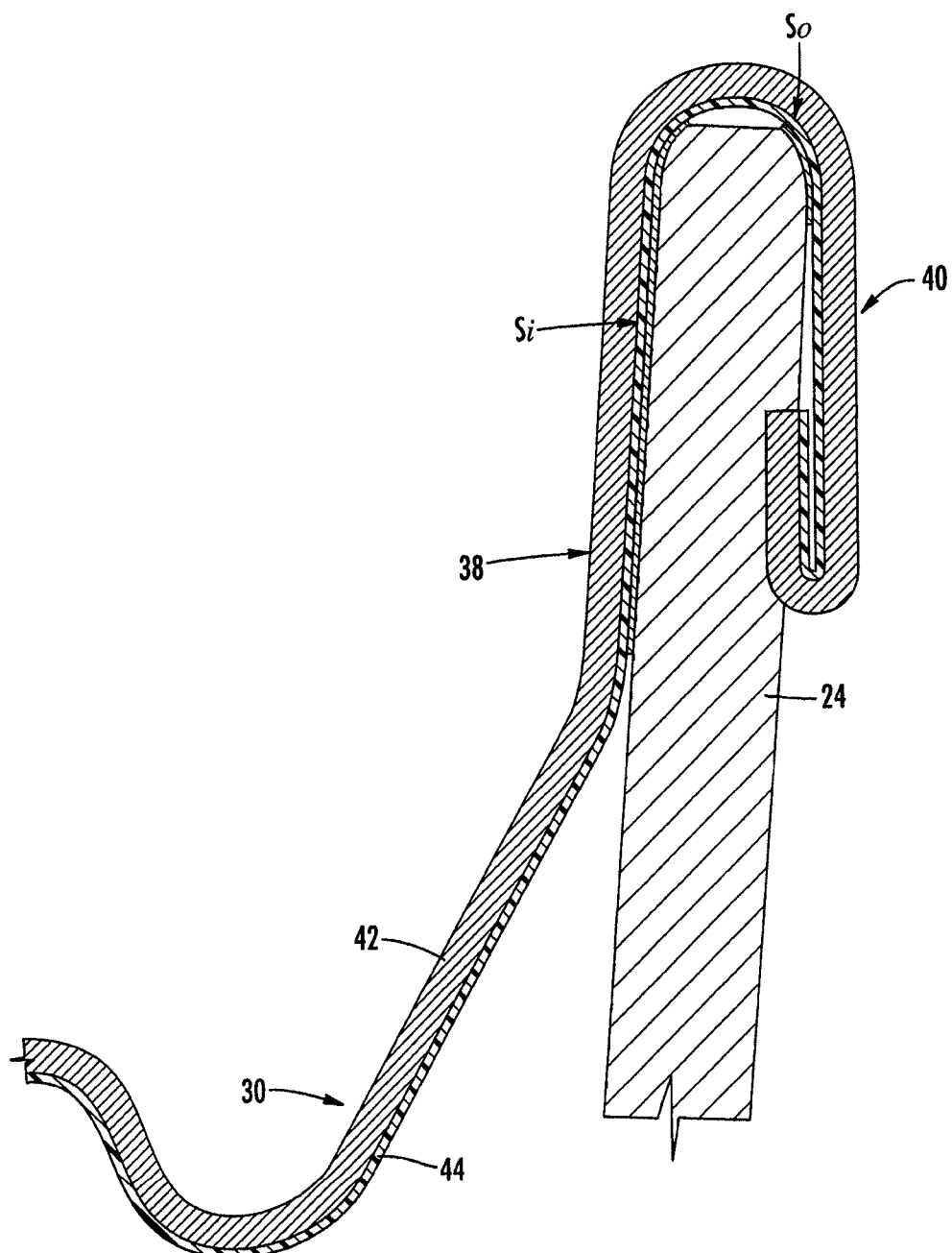
FIG. 7 is a cross-sectional view of a portion, greatly enlarged, of a container in accordance with an embodiment of the invention, showing the structure of the metal end and its seam to the container body.

With reference to FIG. 7, the metal end 30 can have a metal layer 42 and an interior layer or coating of a heat-sealable material 44. Any suitable heat-sealable material can be used for the layer 44, non-limiting examples of which include: acrylonitrile butadiene styrene (ABS), acrylic (PMMA), celluloid, cellulose acetate, cyclic olefin copolymer (COC), ethylene-vinyl acetate (EVA), ethylene vinyl alcohol (EVOH), fluoroplastics (PTFE, alongside with FEP, PFA, CTFE, ECTFE, ETFE), ionomers, liquid crystal polymer (LCP), polyoxymethylene (POM or acetal), polyacrylates (acrylic), polyacrylonitrile (PAN or acrylonitrile), polyamide (PA or Nylon), polyamide-imide (PAI), polyaryletherketone (PAEK or Ketone), polybutadiene (PBD), polybutylene (PB), polybutylene terephthalate (PBT), polycaprolactone (PCL), polychlorotrifluoroethylene (PCTFE), polyethylene naphthalate (PEN), polyethylene terephthalate (PET), polycyclohexylene dimethylene terephthalate (PCT), polycarbonate (PC), polyhydroxyalkanoates (PHAs), polyketone (PK), polyester, polyethylene (PE), polyetheretherketone (PEEK), polyetherketoneketone (PEKK), polyetherimide (PEI), polyethersulfone (PES), chlorinated polyethylene (CPE), polyimide (PI), polylactic acid (PLA), polymethylpentene (PMP), polyphenylene oxide (PPO), polyphenylene sulfide (PPS), polyphthalamide (PPA), polypropylene (PP), polystyrene (PS), polysulfone (PSU), polytrimethylene terephthalate (PTT), polyurethane (PU), polyvinyl acetate (PVA), polyvinyl chloride (PVC), polyvinylidene chloride (PVDC), styrene-acrylonitrile (SAN). Where the container is to be retort-processed, a suitable heat-sealable material able to withstand the retort-processing conditions should be selected.

When the metal layer 42 is heated by induction heating, the heat-sealable layer 44 is heated by conduction, which causes the heat-sealable material to be softened or melted. Because the electromagnetic field's strength obeys the inverse square law, Joule heating of the metal end is greatest in the parts of the end closest to the coil of the induction heater and decreases proportional to the inverse square of the distance from the coil. Thus, only localized heating of the metal end occurs with a great enough magnitude to cause melting of the heat-sealable layer 44. More particularly, the melting of the heat-sealable layer 44 is confined essentially to the region of the seam 40.

As FIG. 7 indicates, the induction heating of the seam 40, followed by cooling (which occurs rapidly upon cessation of the electromagnetic field or movement of the container away from the coil), results in two areas of thermal fusing between the metal end 30 and container body side wall 24: there is an inner seal $S_i$ between the inner surface of the side wall 24 and a portion of the chuck wall 38 that lies parallel to and intimately contacts the side wall, and there is an outer seal $S_o$ between the outer surface of the side wall 24 and a portion of what was the curl of the metal end prior to seaming. The seals $S_i$ and $S_o$ in FIG. 7 are depicted for illustrative purposes as if they were each a distinct layer between the metal end 30 and the side wall 24, but it is to be understood that in reality the seals are formed by a melding of the heat-sealable layer 44 of the metal end and the thermoplastic material on the surface of the side wall 24.

It is important to the attainment of adequate blow-off resistance that the chuck wall 38 include a portion that is parallel to and intimately contacting the inner surface of the side wall 24, and that this portion be thermally fused as described above. This results in the interface between the chuck wall 38 and the side wall 24 being oriented along a direction substantially parallel to the axis of the container, such that stress on the interface caused by internal pressure inside the container exerted on the metal end 30 is predominantly shear stress in the plane of the interface (as opposed to out-of-plane stress tending to peel one part from the other).

It is also a feature of the present invention that during the heating step for thermally fusing the end 30 to the side wall 24, there is a substantial absence of external pressure exerted on the chuck wall 38 and side wall 24 for urging them together. Rather, pressure urging the chuck wall and side wall together comes from the interference fit that exists between them, as previously described. Indeed, when an induction heating apparatus 50 is employed as described above, there is no contact between the induction head and the metal end.

Various constructions of the metal end 30 and container body side wall 24 can be employed in the practice of the present invention. As noted with respect to FIG. 7, in one embodiment the metal end 30 can have an interior heat-sealable layer 44. The container body can be metal as illustrated.

When plastic, the container body side wall 24 can be a mono-layer construction, and the substantially thermoplastic side wall 24 can be heat-sealable to the heat-sealable layer 44 of the metal end. Alternatively, in other embodiments, the side wall 24 can be a multi-layer plastic construction. For example, the side wall 24 can comprise at least two layers including an interior heat-sealable layer and a barrier layer providing moisture and gas barrier properties for the container body. The metal end 30 furthermore does not necessarily have to have an interior heat-sealable layer, as long as the interior surface is fusible to the heat-sealable layer of the side wall 24. The metal end 30 can have a bare metal surface on its interior side. It can have a metal layer of homogeneous construction, but it is also possible for the metal end to be, for example, ETP (electrolytic tin plate steel) consisting of a layer of steel to which an ultra-thin coating of tin is electrolytically deposited, for example on the interior product-facing surface. As an unillustrated example, the container body side wall 24 can consist of five layers, in order from ID to OD: an interior heat-sealable layer, a tie layer, a barrier layer, a tie layer, and an exterior heat-sealable layer. Any of the previously described heat-sealable materials can be used for the heat-sealable layers. The barrier layer can comprise any suitable material providing the necessary barrier properties for the particular application to which the container will be put. Non-limiting examples of such barrier materials include ethylene vinyl alcohol (EVOH), polyvinyl alcohol (PVOH), polyvinylidene chloride copolymer (PVDC), polyacrylonitrile (PAN), polyethylene terephthalate (PET), polyethylene naphthalate (PEN), liquid crystal polymers (LCP), amorphous nylon, nylon 6, nylon 66, nylon-MXD6, and the like. The tie layers can be any suitable adhesive materials for adhering the heat-sealable layers to the barrier layer.

When the metal end 30 does not include a heat-sealable layer, the heat-sealable layers of the container body wall can be designed to thermally fuse to the bare metal surface so as to form the seals $S_i$ and $S_o$ depicted in FIG. 7. For example, an ionomer (e.g., SURLYN® or the like) will thermally fuse to a bare metal such as ETP.

The above-described embodiments are not limiting in terms of the particular construction of the metal end 30 and side wall 24. The present invention is applicable to and includes any combination of metal end and side wall constructions in which at least one of their respective surfaces that are intimately contacting each other in the region of the seam 40 is formed by a heat-sealable material, and the two surfaces are such that heating of the seam to soften or melt this heat-sealable material, followed by cooling of the material, causes the two surfaces to be "thermally fused" to each other. Additionally, as previously noted, it is important for at least part of the chuck wall 38 to be parallel to and intimately contacting the side wall 24 so that an interior seal $S_i$ is created that is placed predominantly in shear by internal pressure in the container such as during retort.

A further advantage of the container of the invention is its ability to undergo elastic expansion during high internal-pressure conditions such as retort, and then return substantially to its original configuration when the high internal pressure is relieved. This helps alleviate internal pressure and, consequently, the stresses exerted on the chuck wall/side wall interface and the seam. To realize this advantage, of course, the container body must be relatively unconstrained so that it is able to expand radially.

The foregoing description focuses on containers having crimp-seamed and sealed metal ends. As noted, however, the invention is not limited to crimp seaming. Alternatively, the metal ends can be double seamed and then sealed via an induction heating or other process. part from the different seam configuration, the double-seamed containers are similar to the previously described crimp-seamed containers. The double seam is characterized by the upper end of the side wall 24 forming a body hook and the curl of the metal end forming an end hook that is interlocked with the body hook.

In typical double-seamed containers, a seaming compound is often applied to the metal end in the region of the curl. The seaming compound flows during double seaming so as to fill up any gaps that may exist between the metal end and container body wall in the seam area. Containers in accordance with the invention can be made either with our without conventional seaming compounds.

In the foregoing description and the appended claims, references to the container body being "substantially thermoplastic" or the like mean that thermoplastic is the majority ingredient of the container body on a volume basis, and furthermore that any non-thermoplastic ingredient(s) does (do) not impair the ability of the container body to be heat-sealed to a metal end or to expand elastically during retort processing as previously described. For example, a substantially thermoplastic container body can include non-thermoplastic ingredients such as pigments (e.g., titanium dioxide), dyes, or other additives for imparting visual characteristics (e.g., coloration, opacity, etc.) or other properties not provided by the thermoplastic itself. As another example, a container body of composite construction such as paper/thermoplastic or metal/thermoplastic would not be "substantially thermoplastic" (even if the thermoplastic were the majority ingredient by volume) if the paper or metal component impaired the ability of the container body to be heat-sealed to a metal end and/or to expand elastically during retort processing.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of making a container, comprising the steps of:
   providing a container body having a side wall extending about and parallel to a longitudinal axis, the side wall having a first end and a second end, the first end defining an edge that extends about an opening of the container body, the side wall having an inner surface and an outer surface;
   providing a metal end, the metal end having at least a metal layer and comprising a central portion and an outer peripheral portion extending generally radially outwardly from the central portion and extending circumferentially about the central portion, the peripheral portion having a radially outer part and a radially inner part, a first heat-sealable material being present on at least one of (a) a lower surface of at least the peripheral portion of the metal end, (b) the inner surface of the side wall adjacent the first end thereof, and (c) the outer surface of the side wall adjacent the first end thereof, the radially outer part of the peripheral portion defining a curl, the radially inner part of the peripheral portion defining a chuck wall that extends generally downward from the curl and has a portion which is substantially parallel with the longitudinal axis of the container, and has a radially outer surface forming an interface with the inner surface of the parallel side wall of the container body, and wherein the substantially parallel chuck wall portion has a first end and a second end, the first end being adjacent the curl, and wherein the second end of the substantially parallel chuck wall portion has a diameter which is smaller than an inner diameter of the side wall, and the first end of the substantially parallel chuck wall portion has a diameter which is larger than the inner diameter of the sidewall;
   applying the metal end to the first end of the container body, wherein the step of applying the metal end to the container body results in the side wall of the container body moving relatively upwardly and wiping the substantially parallel portion of the chuck wall from the second end to the first end such that an interference fit is created between the substantially parallel portion of the chuck wall and the side wall;
   forming a seam connecting the metal end to the first end of the side wall, the container body and seamed metal end constituting a container assembly; and
   induction heating the metal end to melt the first heat-sealable material and then cooling the first heat-sealable material so as to fuse the metal end onto the container body.

2. The method of claim 1, wherein the step of forming a seam comprises forming a crimp seam.

3. The method of claim 1, wherein the step of forming a seam comprises forming a double seam.

4. The method of claim 1, further comprising providing a second heat-sealable material present on at least one of (a) the lower surface of at least the peripheral portion of the metal end, (b) the inner surface of the side wall adjacent the first end thereof, and (c) the outer surface of the side wall adjacent the first end thereof, wherein the location of the second heat-sealable material is different from the location of the first heat-sealable material.

5. The method of claim 1, wherein the container body is substantially thermoplastic.

6. The method of claim 1, further comprising the steps of: filling the container with a food product prior to the step of applying the metal end to the container body; and after the metal end is fused to the side wall, retorting the container.

7. The method of claim 6, wherein the container body is radially unconstrained during the retort process.

8. The method of claim 1, wherein during the induction heating step there is a substantial absence of external pressure exerted on the chuck wall and side wall, pressure between the chuck wall and side wall coming rather from said interference fit.

9. The method of claim 1, wherein the induction heating and cooling steps result in two areas of thermal fusing between the metal end and the container body side wall.

10. The method of claim 9, wherein a first area of thermal fusing occurs between the inner surface of the side wall and the substantially parallel portion of the chuck wall and a second area of thermal fusing occurs between the outer surface of the side wall and an inner surface of the curl, proximate the first end of the container body.

11. The method of claim 9, wherein an unfused area is disposed between the two areas of thermal fusing.

12. A method of making a container, comprising the steps of:
   providing a container body having a side wall extending about and parallel to a longitudinal axis, the side wall having a first end and a second end, the first end defining an edge that extends about an opening of the container body, the side wall having an inner surface and an outer surface;
   providing a metal end, the metal end having at least a metal layer and comprising a central portion and an outer peripheral portion extending generally radially outwardly from the central portion and extending circumferentially about the central portion, the peripheral portion having a radially outer part and a radially inner part, a first heat-sealable material being present on at least one of (a) a lower surface of at least the peripheral portion of the metal end, (b) the inner surface of the side wall adjacent the first end thereof, and (c) the outer surface of the side wall adjacent the first end thereof, the radially outer part of the peripheral portion defining a curl, the radially inner part of the peripheral portion defining a chuck wall that extends generally downward from the curl at a non-zero angle relative to the longitudinal axis of the container, and has a radially outer surface forming an interface with the inner surface of the parallel side wall of the container body, and wherein the chuck wall has a first end and a second end, the first end being adjacent the curl, and wherein the second end of the chuck wall has a diameter which is smaller than an inner diameter of the side wall, and the first end of the chuck wall has a diameter which is larger than the inner diameter of the sidewall;
   applying the metal end to the first end of the container body, wherein the step of applying the metal end to the container body results in the side wall of the container body moving relatively upwardly and wiping the chuck wall from the second end to the first end such that an interference fit is created between the chuck wall and the side wall;
   forming a seam connecting the metal end to the first end of the side wall, the container body and seamed metal end constituting a container assembly; and induction heating the metal end to melt the first heat-sealable material and then cooling the first heat-sealable material so as to fuse the metal end onto the container body.

13. The method of claim 12, wherein the step of forming a seam comprises forming a crimp seam.

14. The method of claim 12, wherein the step of forming a seam comprises forming a double seam.

15. The method of claim 12, further comprising providing a second heat-sealable material present on at least one of (a) the lower surface of at least the peripheral portion of the metal end, (b) the inner surface of the side wall adjacent the first end thereof, and (c) the outer surface of the side wall adjacent the first end thereof, wherein the location of the second heat-sealable material is different from the location of the first heat-sealable material.

16. The method of claim 12, wherein the container body is substantially thermoplastic.

17. The method of claim 12, wherein the induction heating and cooling steps result in two areas of thermal fusing between the metal end and the container body side wall.

18. The method of claim 17, wherein a first area of thermal fusing occurs between the inner surface of the side wall and the chuck wall and a second area of thermal fusing occurs between the outer surface of the side wall and an inner surface of the curl, proximate the first end of the container body.

19. The method of claim 17, wherein an unfused area is disposed between the two areas of thermal fusing.

\* \* \* \* \*